(12) United States Patent
Harada et al.

(10) Patent No.: US 11,033,970 B2
(45) Date of Patent: Jun. 15, 2021

(54) CUTTING INSERT

(71) Applicant: SUMITOMO ELECTRIC HARDMETAL CORP., Itami (JP)

(72) Inventors: Gaku Harada, Itami (JP); Satoru Kukino, Itami (JP); Takashi Harada, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 0 days.

(21) Appl. No.: 16/767,797

(22) PCT Filed: Oct. 16, 2019

(86) PCT No.: PCT/JP2019/040540
§ 371 (c)(1),
(2) Date: May 28, 2020

(65) Prior Publication Data
US 2021/0114117 A1    Apr. 22, 2021

(51) Int. Cl.
*B23B 27/10* (2006.01)
*B23B 27/16* (2006.01)

(52) U.S. Cl.
CPC ......... *B23B 27/1611* (2013.01); *B23B 27/10* (2013.01); *B23B 2200/0471* (2013.01)

(58) Field of Classification Search
CPC .............. B23B 27/1611; B23B 27/10; B23B 2226/125; B23B 2200/3672; B23B 2200/245
See application file for complete search history.

(56) References Cited

U.S. PATENT DOCUMENTS

| 4,643,620 A | * | 2/1987 | Fujii | ...................... B23P 15/30 |
| | | | | 407/119 |
| 5,346,335 A | | 9/1994 | Harpaz et al. | |
| 2001/0007215 A1 | | 7/2001 | Murata et al. | |

FOREIGN PATENT DOCUMENTS

| CA | 2554824 A1 | * | 9/2006 | ........... B23B 27/145 |
| JP | S55-165702 U | | 11/1980 | |
| JP | H03-33005 U | | 4/1991 | |
| JP | H04-183503 A | | 6/1992 | |
| JP | H05-116008 A | | 5/1993 | |
| JP | 2001-198708 A | | 7/2001 | |
| JP | 2012-514541 A | | 6/2012 | |

(Continued)

OTHER PUBLICATIONS

Written Opinion of the International Searching Authority dated Dec. 3, 2019 for PCT/JP2019/040540, including English language translation.

*Primary Examiner* — Alan Snyder
(74) *Attorney, Agent, or Firm* — Faegre Drinker Biddle & Reath LLP

(57) ABSTRACT

A cutting insert includes a bottom surface, a top surface opposite to the bottom surface, and a cutting edge portion. The cutting edge portion is located on the same side as the top surface. The cutting edge portion is formed of a sintered material including cubic boron nitride particles. A volume ratio of the cubic boron nitride particles to the sintered material is more than or equal to 50 percent. The cutting edge portion includes a rake face, a flank face contiguous to the rake face, and a cutting edge located along a ridgeline between the rake face and the flank face. The rake face is inclined toward the bottom surface so that a distance from the rake face to the bottom surface decreases gradually toward the cutting edge.

5 Claims, 7 Drawing Sheets

(56) References Cited

FOREIGN PATENT DOCUMENTS

| | | | |
|---|---|---|---|
| JP | 2013-49106 A | 3/2013 | |
| JP | 2014-18891 A | 2/2014 | |
| KR | 10-1440956 B1 | 9/2014 | |
| WO | WO-9605008 A1 * | 2/1996 | ............ B23B 27/10 |
| WO | WO-2010/079472 A1 | 7/2010 | |
| WO | WO-2018/153907 A1 | 8/2018 | |

* cited by examiner

CUTTING INSERT

TECHNICAL FIELD

The present disclosure relates to a cutting insert.

BACKGROUND ART

PTL 1 (Japanese Patent Laying-Open No. H04-183503) discloses a throwaway insert. The throwaway insert disclosed in PTL 1 includes a bottom surface, a top surface opposite to the bottom surface, a flank face contiguous to the bottom surface and the top surface, and a supported surface contiguous to the bottom surface, the top surface, and the flank face. The top surface includes a rake face contiguous to the flank face, and a breaker surface located on the opposite side to the flank face and contiguous to the rake face. A cutting edge is formed along a ridgeline between the rake face and the flank face.

A coolant supply hole is formed in the inside of the throwaway insert disclosed in PTL 1. The coolant supply hole has one end connecting to the supported surface and the other end connecting to the breaker surface. The coolant supply hole is open in the breaker surface.

CITATION LIST

Patent Literature

PTL 1: Japanese Patent Laying-Open No. H04-183503

SUMMARY OF INVENTION

A cutting insert in the present disclosure includes a bottom surface, a top surface opposite to the bottom surface, and a cutting edge portion. The cutting edge portion is located on the same side as the top surface. The cutting edge portion is formed of a sintered material including cubic boron nitride particles. A volume ratio of the cubic boron nitride particles to the sintered material is more than or equal to 50 percent. The cutting edge portion includes a rake face, a flank face contiguous to the rake face, and a cutting edge located along a ridgeline between the rake face and the flank face. The rake face is inclined toward the bottom surface so that a distance from the rake face to the bottom surface decreases gradually toward the cutting edge. A coolant flow path is formed in an inside of the cutting edge portion. The coolant flow path includes a coolant ejection outlet that is open in the rake face. A distance from the coolant flow path to the bottom surface is constant or decreases gradually toward the coolant ejection outlet.

DETAILED DESCRIPTION

Figure 1:
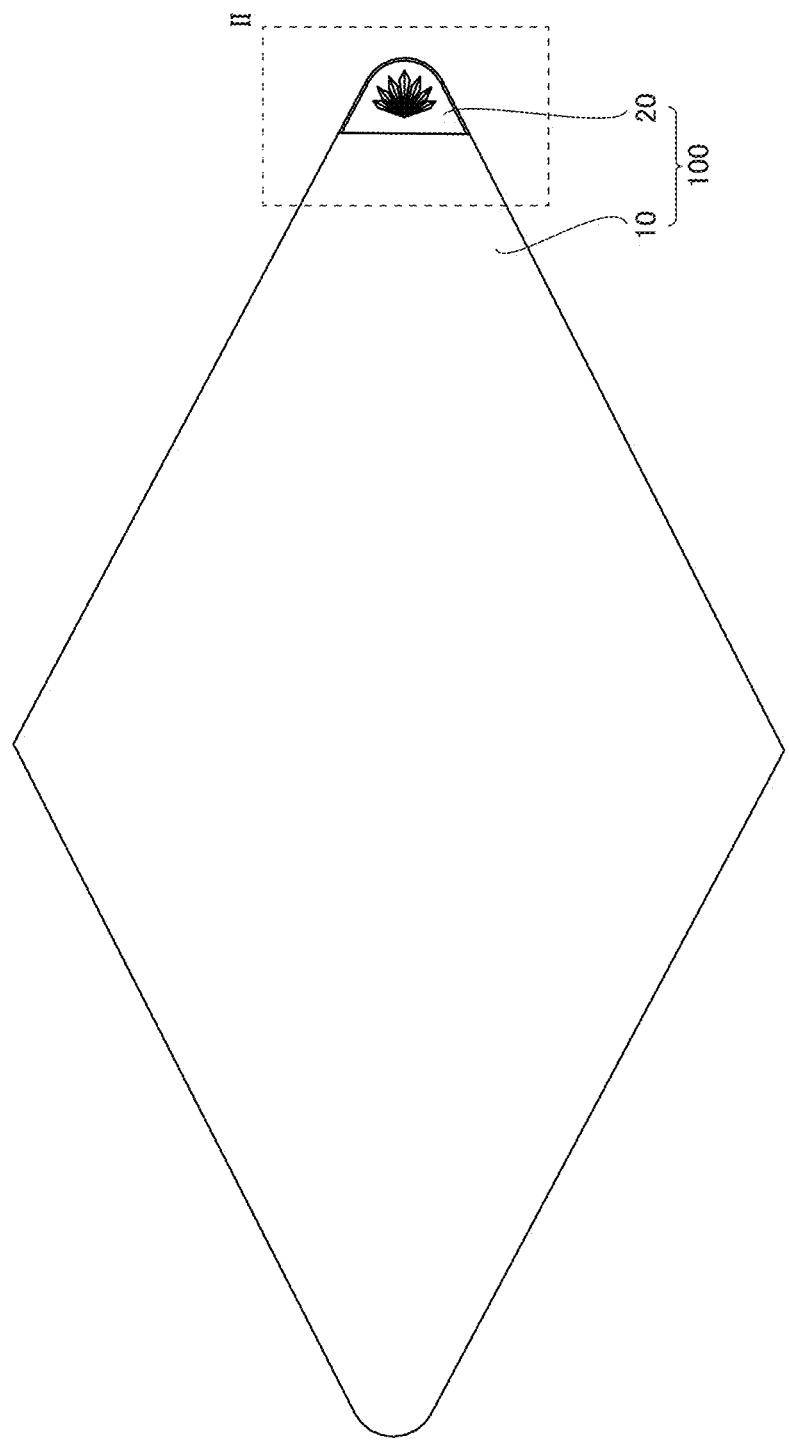
FIG. 1 is a plan view of a cutting insert 100.

Problem to be Solved by the Present Disclosure

In the throwaway insert disclosed in PTL 1, the coolant supply hole is inclined so that the distance from the coolant supply hole to the bottom surface increases gradually toward its opening in the breaker surface. Therefore, coolant ejected from the opening in the breaker surface is less likely to be ejected toward the cutting edge. As a result, the throwaway insert disclosed in PTL 1 cannot be cooled effectively by coolant.

An object of the present disclosure is to provide a cutting insert that can be cooled effectively by coolant.

The cutting insert in the present disclosure can be cooled effectively by coolant.

DESCRIPTION OF EMBODIMENTS OF THE PRESENT DISCLOSURE

Embodiments of the present disclosure are now described one by one.

(1) A cutting insert according to one embodiment includes a bottom surface, a top surface opposite to the bottom surface, and a cutting edge portion. The cutting edge portion is located on the same side as the top surface. The cutting edge portion is formed of a sintered material including cubic boron nitride particles. A volume ratio of the cubic boron nitride particles to the sintered material is more than or equal to 50 percent. The cutting edge portion includes a rake face, a flank face contiguous to the rake face, and a cutting edge located along a ridgeline between the rake face and the flank face. The rake face is inclined toward the bottom surface so that a distance from the rake face to the bottom surface decreases gradually toward the cutting edge. A coolant flow path is formed in an inside of the cutting edge portion. The coolant flow path includes a coolant ejection outlet that is open in the rake face. A distance from the coolant flow path to the bottom surface is constant or decreases gradually toward the coolant ejection outlet.

In the cutting insert described above in (1), the coolant flow path is inclined with respect to the reference plane so that the distance from the coolant flow path to the bottom surface decreases gradually toward the coolant ejection outlet, and accordingly, supply of coolant to the vicinity of the cutting edge is facilitated. In the cutting insert described above in (1), the coolant flow path is formed in the inside of the cutting edge portion, and accordingly, the cutting edge portion can be cooled from its inside by coolant. As seen from the above, the cutting insert described above in (1) enables effective cooling by coolant.

(2) Regarding the cutting insert described above in (1), an inclination angle formed by a tangent to the rake face and a reference plane that is an imaginary plane parallel to the bottom surface may increase gradually toward the cutting edge, as seen in a cross section orthogonal to a direction in which the cutting edge extends.

Regarding the cutting insert described above in (2), swarf generated from a workpiece by the cutting edge is easily brought into surface contact with the rake face, and accordingly, generation of heat due to contact between swarf and the rake face can be suppressed.

(3) Regarding the cutting insert described above in (2), the inclination angle at an end, which meets the cutting edge, of the rake face may be more than or equal to 5° and less than or equal to 35°.

(4) Regarding the cutting insert described above in (1) to (3), at least one groove extending from the coolant ejection outlet toward the cutting edge may be formed in the rake face.

Regarding the cutting insert described above in (4), coolant ejected from the coolant ejection outlet is held in the groove(s) and supplied to the vicinity of the cutting edge. Thus, in the cutting insert described above in (4), coolant can be supplied more reliably to the vicinity of the cutting edge, regardless of the posture in which the cutting insert is held.

(5) Regarding the cutting insert described above in (4), a plurality of grooves may be formed in the rake face radially toward the cutting edge.

In the cutting insert described above in (5), coolant can be supplied to the vicinity of the cutting edge, evenly over the region where the cutting edge extends.

Details of Embodiments of the Present Disclosure

Next, details of the embodiments are described with reference to the drawings. In the following drawings, the same or corresponding parts are denoted by the same reference characters, and the description thereof is not repeated.

Configuration of Cutting Insert in the Embodiments

In the following, a configuration of a cutting insert (hereinafter referred to as "cutting insert 100") in the embodiments is described.

Figure 2:
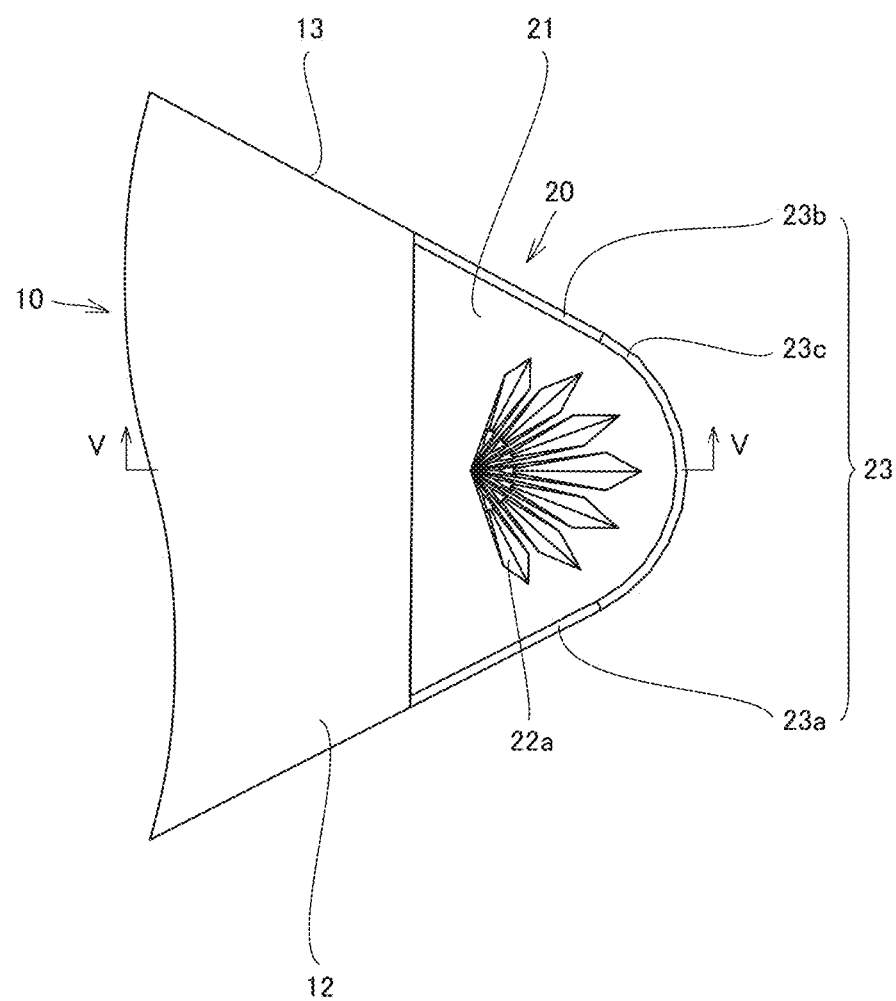
FIG. 2 is an enlarged view of a region II in FIG. 1.
Figure 3:
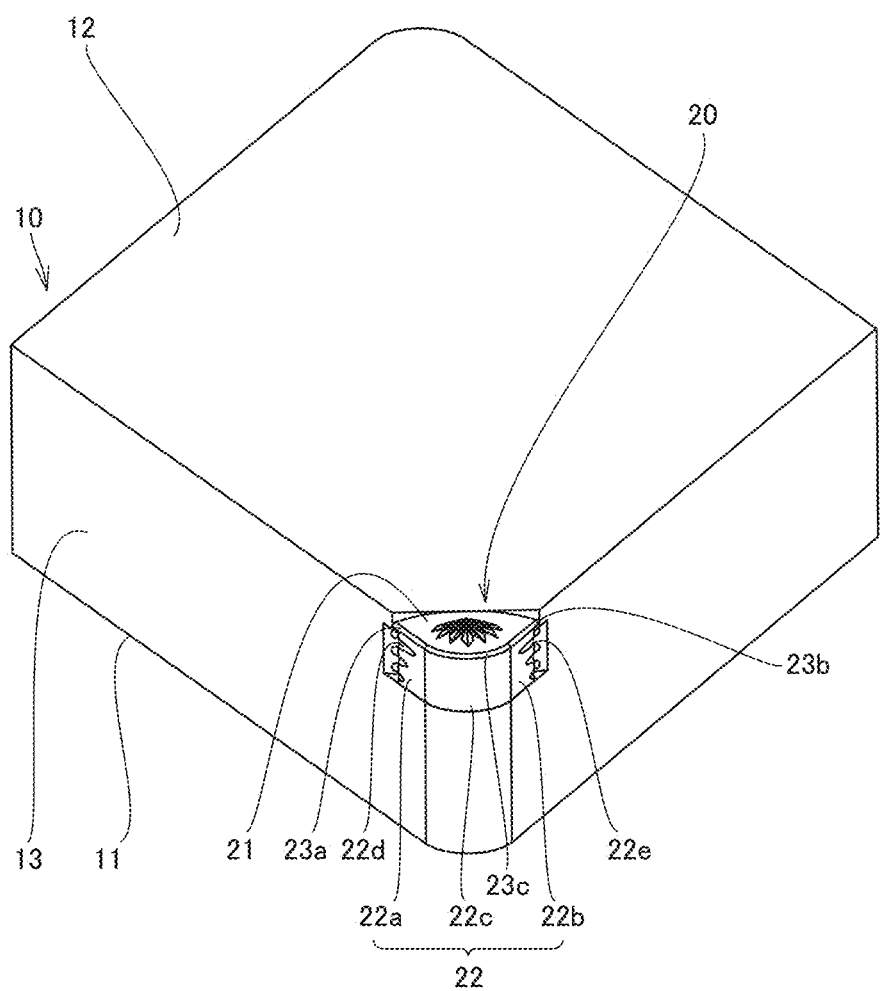
FIG. 3 is a perspective view of cutting insert 100.

FIG. 1 is a plan view of cutting insert 100. FIG. 2 is an enlarged view of a region II in FIG. 1. FIG. 3 is a perspective view of cutting insert 100. As shown in FIGS. 1, 2, and 3, cutting insert 100 includes a main body 10 and a cutting edge portion 20.

Figure 4:
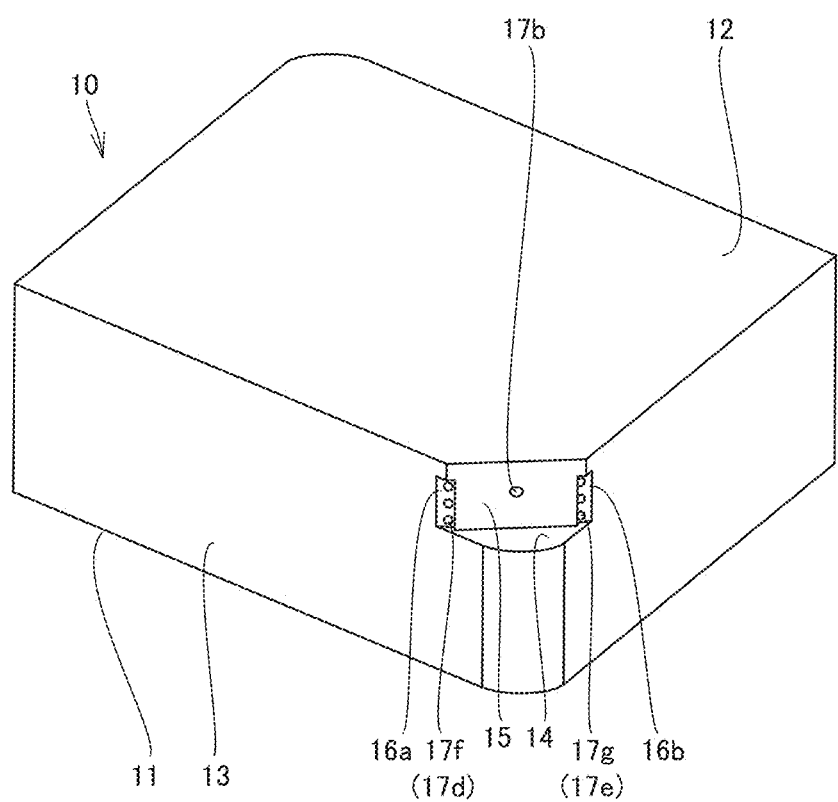
FIG. 4 is a perspective view of a main body 10.

Main body 10 is made of a cemented carbide, for example. FIG. 4 is a perspective view of main body 10. As shown in FIG. 4, main body 10 includes a bottom surface 11, a top surface 12, and a side surface 13. Top surface 12 is opposite to bottom surface 11. Side surface 13 is contiguous to bottom surface 11 and top surface 12. Bottom surface 11, top surface 12, and side surface 13 form the bottom surface of cutting insert 100, the top surface of cutting insert 100, and the side surface of cutting insert 100, respectively.

Main body 10 has a rhombus shape (see FIG. 1) as seen in plan view (seen in the direction orthogonal to top surface 12). "Rhombus shape" herein also includes the one having rounded corners as seen in plan view of main body 10.

The shape of main body 10 as seen in plan view is not limited to the rhombus shape. The shape of main body 10 as seen in plan view may be a rectangular shape, or triangular shape. "Rectangular shape" and "triangular shape" herein also include those having rounded corners as seen in plan view of main body 10.

Top surface 12 includes a seat surface 14 and a supporting surface 15. Seat surface 14 is located at a corner of main body 10 as seen in plan view. The distance between seat surface 14 and bottom surface 11 is smaller than the distance between top surface 12 except for seat surface 14 and bottom surface 11. In other words, a step is formed between seat surface 14 and top surface 12 except for seat surface 14. Supporting surface 15 extends in the direction from bottom surface 11 toward top surface 12, and is contiguous to seat surface 14 and top surface 12 except for seat surface 14.

Main body 10 may further include a first surface 16a and a second surface 16b. First surface 16a is located between side surface 13 and supporting surface 15, and second surface 16b is located between side surface 13 and supporting surface 15. Second surface 16b is opposite to first surface 16a with supporting surface 15 located in between.

Cutting edge portion 20 is formed of a sintered material including cubic boron nitride (CBN) particles. The volume ratio of the cubic boron nitride particles to the sintered material that forms cutting edge portion 20 is more than or equal to 50 percent. For measuring the volume ratio of the cubic boron nitride particles to the sintered material that forms cutting edge portion 20, firstly an image of a cross-sectional structure in cutting edge portion 20 is captured by an SEM (scanning electron microscope). Secondly, an image analysis is performed on the captured image of the cross-sectional structure to calculate the area ratio of the cubic boron nitride particles to the cross-sectional structure in the image. Then, the calculated area ratio of the cubic boron nitride particles is regarded as the volume ratio of the cubic boron nitride particles to the sintered material that forms cutting edge portion 20. The image of the cross-sectional structure in cutting edge portion 20 is captured by an SEM at a magnification of 1000× or more and 5000× or less.

The sintered material that forms cutting edge portion 20 includes cubic boron nitride particles and a binder. The binder is cobalt (Co) for example. The sintered material that forms cutting edge portion 20 may include cubic boron nitride particles, diamond particles, and a binder.

The sintered material that forms cutting edge portion 20 may be a sintered material of binderless cubic boron nitride particles. The sintered material of binderless cubic boron nitride particles includes no binder. The sintered material of binderless cubic boron nitride particles may include inevitable impurities, and particles of boron nitride having a crystal structure in a form other than the cubic form, such as hexagonal boron nitride (hBN) and wurtzite boron nitride (wBN).

As shown in FIG. 3, cutting edge portion 20 includes a rake face 21, a flank face 22, and a cutting edge 23. Cutting edge portion 20 further includes a bottom surface 24 and a supported surface 25 (see FIG. 5). Rake face 21 is contiguous to flank face 22. On the opposite side to rake face 21, flank face 22 is contiguous to side surface 13. Flank face 22 is contiguous to rake face 21 and bottom surface 24.

Flank face 22 includes a first flank face 22a, a second flank face 22b, and a third flank face 22c. First flank face 22a and second flank face 22b are each formed by a planar surface. Third flank face 22c is formed by a curved surface. Third flank face 22c is located between first flank face 22a and second flank face 22b, and contiguous to both first flank face 22a and second flank face 22b.

Cutting edge 23 is formed along a ridgeline between rake face 21 and flank face 22. Cutting edge 23 is round-honed, for example. Cutting edge 23 includes a first cutting edge 23a, a second cutting edge 23b, and a third cutting edge 23c. First cutting edge 23a is formed along the ridgeline between rake face 21 and first flank face 22a, and second cutting edge 23b is formed along the ridgeline between rake face 21 and second flank face 22b. Third cutting edge 23c is formed along the ridgeline between rake face 21 and third flank face 22c.

First cutting edge 23a and second cutting edge 23b each extend linearly as seen in plan view. Third cutting edge 23c has one end contiguous to first cutting edge 23a and the other end contiguous to second cutting edge 23b. Third cutting edge 23c extends in the form of a curve that bulges toward the outside of cutting insert 100 as seen in plan view. In other words, an imaginary straight line connecting one end of third cutting edge 23c to the other end of third cutting edge 23c extends across the top surface of rake face 21.

Bottom surface 24 is opposite to rake face 21. Bottom surface 24 faces seat surface 14. Supported surface 25 is contiguous to rake face 21, flank face 22, and bottom surface 24. Supported surface 25 faces supporting surface 15.

Bottom surface 24 and supported surface 25 of cutting edge portion 20 are attached by brazing for example to main body 10 (specifically to seat surface 14 and supporting surface 15). Accordingly, cutting edge portion 20 is located on the same side as the top surface of cutting insert 100.

In flank face 22, a groove 22d and a groove 22e are formed. Groove 22d extends from the end of first flank face 22a that is on the opposite side to third flank face 22c, in the direction parallel to cutting edge 23 (first cutting edge 23a). Groove 22e extends from the end of second flank face 22b that is on the opposite side to third flank face 22c, in the direction parallel to cutting edge 23 (second cutting edge 23b). In groove 22d and groove 22e, flank face 22 is recessed. Each of groove 22d and groove 22e may be more than one groove. Groove 22d (groove 22e) located relatively closer to cutting edge 23 extends relatively longer.

Figure 5:
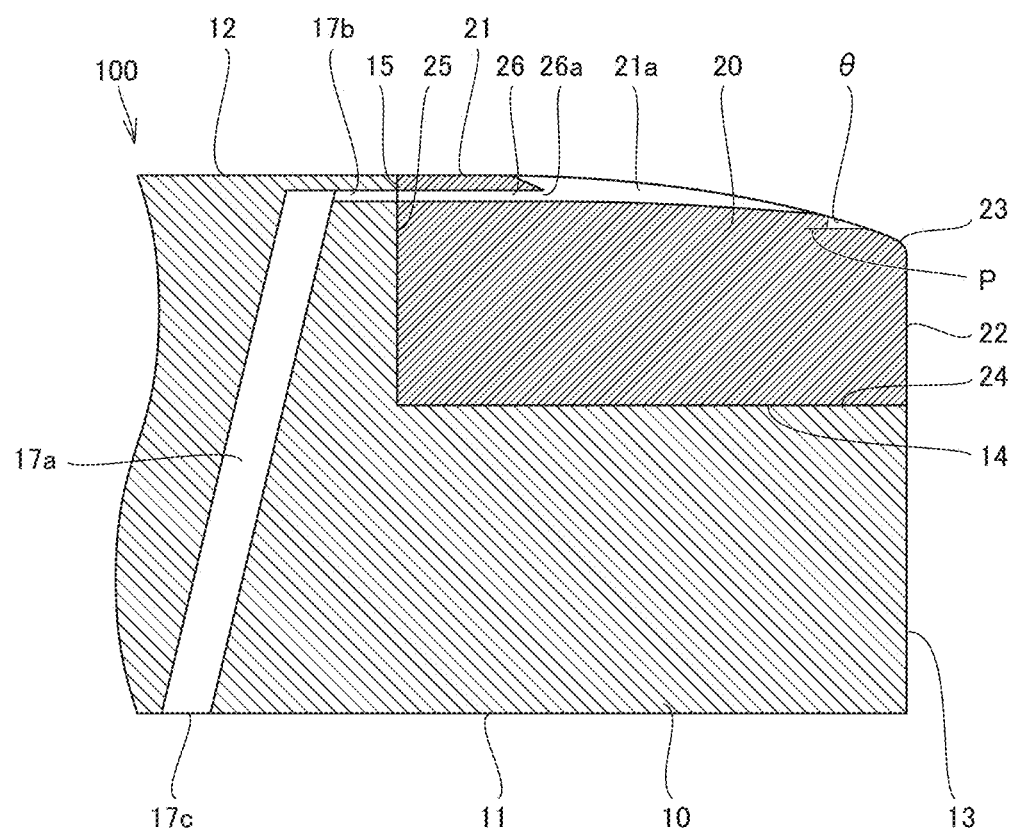
FIG. 5 is a cross-sectional view of cutting insert 100 orthogonal to the direction in which a cutting edge 23 extends.

FIG. 5 is a cross-sectional view of cutting insert 100 orthogonal to the direction in which cutting edge 23 extends. As shown in FIG. 5, rake face 21 is inclined with respect to a reference plane P so that the distance from rake face 21 to bottom surface 11 decreases gradually toward cutting edge 23.

An imaginary plane parallel to bottom surface 11 is defined as reference plane P. Inclination angle θ is an angle formed by a tangent to rake face 21 and reference plane P, as seen in a cross section orthogonal to the direction in which cutting edge 23 extends. Preferably, inclination angle θ increases gradually toward cutting edge 23. In another respect, inclination angle θ approaches 0° (the rake face becomes closer to be parallel to reference plane P) as the distance from cutting edge 23 increases. Preferably, inclination angle θ at the end, which meets cutting edge 23, of rake face 21 is more than or equal to 5° and less than or equal to 35°.

A coolant flow path 26 is formed in the inside of cutting edge portion 20. One end of coolant flow path 26 connects to rake face 21. Coolant flow path 26 includes a coolant ejection outlet 26a that is open in rake face 21. The other end of coolant flow path 26 connects to supported surface 25 and is open in supported surface 25. The distance from coolant flow path 26 to bottom surface 11 is constant. Coolant flow path 26 may be inclined toward bottom surface 11 so that the distance from coolant flow path 26 to bottom surface 11 decreases gradually toward coolant ejection outlet 26a.

A coolant flow path 17a and a coolant flow path 17b are formed in the inside of main body 10. One end of coolant flow path 17a connects to bottom surface 11. Coolant flow path 17a includes a coolant supply inlet 17c that is open in bottom surface 11. The other end of coolant flow path 17a connects to one end of coolant flow path 17b. The other end of coolant flow path 17b connects to supporting surface 15. Coolant flow path 17b is open in supporting surface 15, and connects to the other end of coolant flow path 26.

A coolant flow path 17d and a coolant flow path 17e are further formed in the inside of main body 10. One end of each of coolant flow path 17d and coolant flow path 17e connects to coolant flow path 17a. As shown in FIG. 2, the other end of coolant flow path 17d and the other end of coolant flow path 17e connect to first surface 16a and second surface 16b, respectively. Coolant flow path 17d includes a coolant ejection outlet 17f that is open in first surface 16a, and coolant flow path 17e includes a coolant ejection outlet 17g that is open in second surface 16b.

A groove 22d is formed in rake face 21. The number of groove 22d is more than one, for example. In groove 22d, rake face 21 is recessed. Groove 22d connects to coolant ejection outlet 26a, and extends from coolant ejection outlet 26a toward cutting edge 23. A plurality of grooves 22d are formed radially toward cutting edge 23, for example. In a cross section orthogonal to the direction in which groove 22d extends, the shape of groove 22d is not particularly limited.

Coolant supplied from coolant supply inlet 17c flows through coolant flow path 17a, coolant flow path 17b, and coolant flow path 26, and is ejected from coolant ejection outlet 26a. The coolant ejected from coolant ejection outlet 26a is guided along groove 22d and supplied from the rake face 21 side to the vicinity of cutting edge 23.

Coolant supplied from coolant supply inlet 17c flows through coolant flow path 17a and coolant flow path 17d, and is ejected from coolant ejection outlet 17f, or flows through coolant flow path 17a and coolant flow path 17e and is ejected from coolant ejection outlet 17g. The coolant ejected from coolant ejection outlet 17f and coolant ejection outlet 17g is guided along groove 22d and groove 22e and supplied to the vicinity of cutting edge 23.

<Modification>

Figure 6:
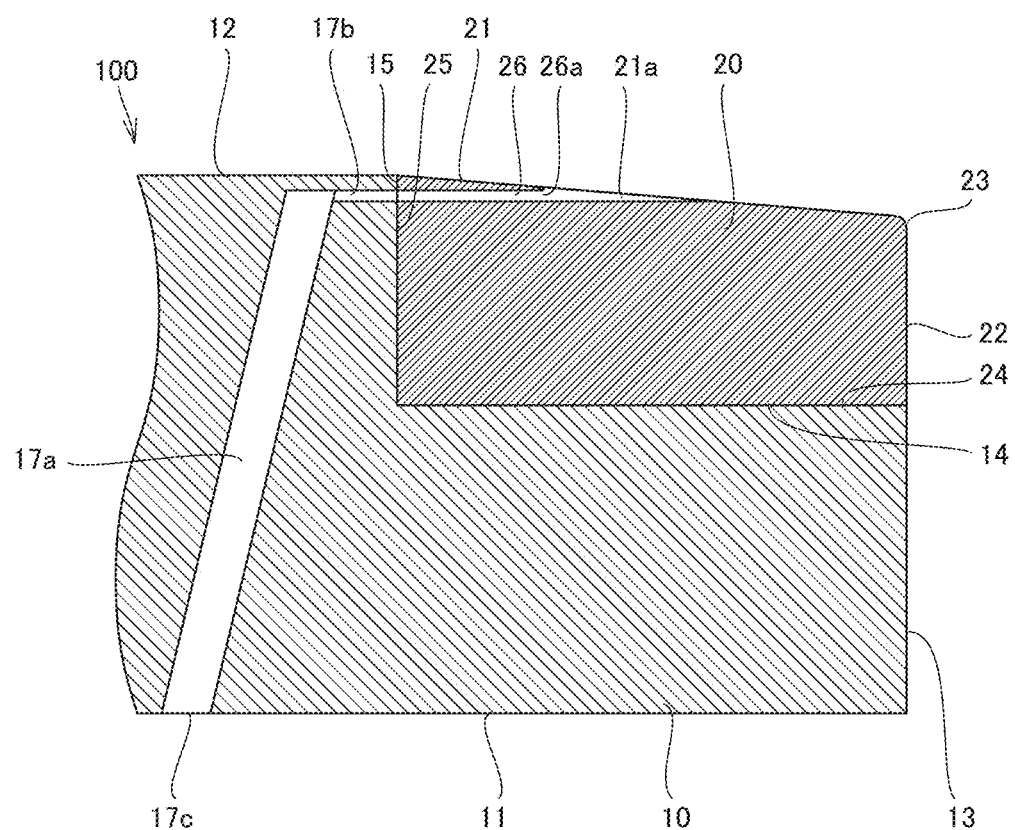
FIG. 6 is a cross-sectional view of a modification of cutting insert 100 orthogonal to the direction in which cutting edge 23 extends.

FIG. 6 is a cross-sectional view of a modification of cutting insert 100 orthogonal to the direction in which cutting edge 23 extends. As shown in FIG. 6, in the modification of cutting insert 100, rake face 21 is inclined toward bottom surface 11 so that the distance from rake face 21 to bottom surface 11 decreases gradually toward cutting edge 23. Inclination angle θ may be constant.

As to cutting insert 100, main body 10 is made of a cemented carbide and cutting edge portion 20 is formed of a sintered material in which the volume ratio of cubic boron nitride particles is more than or equal to 50 percent. Alternatively, in cutting insert 100, main body 10 and cutting edge portion 20 may be integrated into a single unit, and the whole cutting insert may be formed of a sintered material in which the volume ratio of cubic boron nitride particles is more than or equal to 50 percent.

Method for Manufacturing Cutting Insert in the Embodiments

In the following, a method for manufacturing cutting insert 100 is described.

Figure 7:
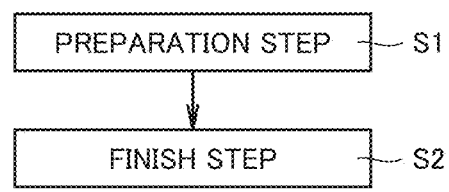
FIG. 7 is a manufacturing process diagram for cutting insert 100.

FIG. 7 is a manufacturing process diagram for cutting insert 100. As shown in FIG. 7, the method for manufacturing cutting insert 100 includes a preparation step S1 and a finish step S2. In preparation step S1, firstly main body 10 and cutting edge portion 20 are prepared.

In main body 10 prepared in preparation step S1, coolant flow path 17a, coolant flow path 17d, and coolant flow path 17e have already been formed, while coolant flow path 17b has not yet been formed. In main body 10 prepared in preparation step S1, coolant flow path 17d is not open in first surface 16a and coolant flow path 17e is not open in second surface 16b (coolant ejection outlet 17f and coolant ejection outlet 17g have not yet been formed). On cutting edge portion 20 prepared in preparation step S1, rake face 21, cutting edge 23, groove 22d, and groove 22e have not yet been formed.

In preparation step S1, secondly the prepared cutting edge portion 20 is attached to the prepared main body 10. This is attached for example by brazing.

In finish strep S2, a finish treatment is performed. More specifically, formation of rake face 21 and cutting edge 23, formation of coolant flow path 26, coolant ejection outlet 26a, and coolant flow path 17b, formation of coolant ejection outlet 17f and coolant ejection outlet 17g, formation of groove 21a, and formation of groove 22d and groove 22e are performed.

Formation of rake face 21 is performed by applying laser beam to partially remove cutting edge portion 20. As rake face 21 is formed, the ridgeline between rake face 21 and flank face 22 forms cutting edge 23. Coolant flow path 26 and coolant ejection outlet 26a are formed by applying laser beam from the rake face 21 side to drill a hole in cutting edge portion 20. Coolant flow path 17b is formed by applying laser beam through coolant flow path 26.

Groove 21a is formed by applying laser beam from the rake face 21 side to partially remove cutting edge portion 20. Groove 22d and groove 22e are formed by applying laser beam from the flank face 22 side to partially remove cutting edge portion 20. Coolant ejection outlet 17f is formed by applying laser beam to first surface 16a to open coolant flow path 17d in first surface 16a. Coolant ejection outlet 17g is formed by applying laser beam to second surface 16b to open coolant flow path 17e in second surface 16b.

According to the above-described example, coolant flow path 17a, coolant flow path 17d, and coolant flow path 17e are formed in advance in main body 10 prepared in preparation step S1. Alternatively, coolant flow path 17a, coolant flow path 17d, and coolant flow path 17e may be formed by laser processing in finish step S2.

Advantageous Effects of Cutting Insert in the Embodiments

In the following, advantageous effects of cutting insert 100 are described.

In cutting insert 100, the distance from coolant flow path 26 to bottom surface 11 is constant or decreases gradually toward coolant ejection outlet 26a. Accordingly, coolant is ejected from coolant ejection outlet 26a toward cutting edge 23, so that the coolant is supplied easily to the vicinity of cutting edge 23. The easy supply of coolant to the vicinity of cutting edge 23 increases the efficiency of cooling cutting edge 23.

In cutting insert 100, rake face 21 is inclined toward bottom surface 11 so that the distance from rake face 21 to bottom surface 11 decreases gradually toward cutting edge 23. If rake face 21 is not inclined in such a manner, the distance from coolant flow path 26 to bottom surface 11 cannot be made constant or cannot be decreased gradually toward coolant ejection outlet 26a.

In cutting insert 100, coolant flow path 26 extends inside cutting edge portion 20. Accordingly, coolant flowing thorough coolant flow path 26 can cool not only cutting edge 23 but also cutting edge portion 20 from inside. Thus, cutting insert 100 enables efficient cooling of the cutting edge portion by coolant.

The cutting insert having the cutting edge portion formed of a sintered material in which cubic boron nitride particles are a main component is applied to high-productivity processing of a difficult-to-cut material (hardened steel, for example). At this time, the cutting edge portion having an excessively increased temperature cannot exhibit adequate performance (cutting edge strength, sharpness, for example). In cutting insert 100, coolant is easily supplied to the vicinity of cutting edge 23 and cutting edge portion 20 is cooled from inside by coolant. As a result, increase of the temperature of the cutting edge portion is suppressed and cutting insert 100 can exhibit its performance in high-productivity processing of a difficult-to-cut material.

If inclination angle $\theta$ is constant, swarf generated from cutting edge 23 is likely to be brought into surface-contact with rake face 21. In contrast, if inclination angle $\theta$ increases gradually toward cutting edge 23, contact between swarf generated from cutting edge 23 and rake face 21 is close to line contact. Therefore, in this case, generation of heat due to contact between swarf and rake face 21 is suppressed.

Cutting insert 100 is held in various postures to be used for cutting. Therefore, depending on the posture in which cutting insert 100 is held, coolant ejected from coolant ejection outlet 26a under the influence of gravity is less likely to be supplied to the vicinity of cutting edge 23. In cutting insert 100 in which groove 21a is formed in rake face 21, coolant ejected from coolant ejection outlet 26a is likely to be held in groove 22d by surface tension. Therefore, in this case, coolant ejected from coolant ejection outlet 26a is likely to be guided by groove 22d to be supplied to the vicinity of cutting edge 23, regardless of the posture in which cutting insert 100 is held. When grooves 22d are formed radially toward cutting edge 23, coolant is easily supplied evenly over the region where cutting edge 23 extends.

It should been construed that the embodiments disclosed herein are given by way of illustration in all respects, not by way of limitation. It is intended that the scope of the present invention is defined by claims, not by the embodiments above, and encompasses all modifications and variations equivalent in meaning and scope to the claims.

REFERENCE SIGNS LIST 10 main body; 11 bottom surface; 12 top surface; 13 side surface; 14 seat surface; 15 supporting surface; 16a first surface; 16b second surface; 17a, 17b coolant flow path; 17c coolant supply inlet; 17d, 17e coolant flow path; 17f, 17g coolant ejection outlet; 20 cutting edge portion; 21 rake face; 21a groove; 22 flank face; 22a first flank face; 22b second flank face; 22c third flank face; 22d, 22e groove; 23 cutting edge; 23a first cutting edge; 23b second cutting edge; 23c third cutting edge; 24 bottom surface; 25 supported surface; 26 coolant flow path; 26a coolant ejection outlet; 100 cutting insert; P reference plane; S1 preparation step; S2 finish step

The invention claimed is:

1. A cutting insert comprising:
   a bottom surface;
   a top surface opposite to the bottom surface; and
   a cutting edge portion located on the same side as the top surface,
   the cutting edge portion being formed of a sintered material including cubic boron nitride particles,
   a volume ratio of the cubic boron nitride particles to the sintered material being more than or equal to 50 percent,
   the cutting edge portion including a rake face, a flank face contiguous to the rake face, and a cutting edge located along a ridgeline between the rake face and the flank face,
   the rake face being inclined toward the bottom surface so that a distance from the rake face to the bottom surface decreases gradually toward the cutting edge,
   a coolant flow path being formed in an inside of the cutting edge portion,
   the coolant flow path including a coolant ejection outlet that is open in the rake face, a distance from the coolant flow path to the bottom surface decreasing gradually toward the coolant ejection outlet.

2. The cutting insert according to claim 1, wherein an inclination angle formed by a tangent to the rake face and a reference plane that is an imaginary plane parallel to the bottom surface increases gradually toward the cutting edge, as seen in a cross section orthogonal to a direction in which the cutting edge extends.

3. The cutting insert according to claim 2, wherein the inclination angle at an end, which meets the cutting edge, of the rake face is more than or equal to 5° and less than or equal to 35°.

4. The cutting insert according to claim 1, wherein at least one groove extending from the coolant ejection outlet toward the cutting edge is formed in the rake face.

5. The cutting insert according to claim 4, wherein the at least one groove is a plurality of grooves formed radially toward the cutting edge.

\* \* \* \* \*